United States Patent [19]

Leisring

[11] 4,057,335
[45] Nov. 8, 1977

[54] FILM DRIVE FOR MOTION PICTURE APPARATUS

[75] Inventor: Herbert Leisring, Fellbach, Germany

[73] Assignee: Robert Bosch GmbH, Stuttgart, Germany

[21] Appl. No.: 677,884

[22] Filed: Apr. 19, 1976

[30] Foreign Application Priority Data

Apr. 24, 1975 Germany .............................. 2518171

[51] Int. Cl.$^2$ ............................................... G03B 1/24
[52] U.S. Cl. ..................................... 352/188; 352/124; 352/190; 226/76; 226/79
[58] Field of Search ............... 352/187, 188, 189, 190, 352/124; 226/76, 79

[56] References Cited

U.S. PATENT DOCUMENTS

| | | | |
|---|---|---|---|
| 1,847,312 | 3/1932 | Seufert | 352/188 |
| 2,559,509 | 7/1951 | Mercier | 352/188 |

Primary Examiner—Monroe H. Hayes
Attorney, Agent, or Firm—Michael J. Striker

[57] ABSTRACT

A film drive for a motion-picture camera or projector has a film drive wheel which is rotatable about a first axis and has a plurality of angularly equi-spaced and radially extending teeth. A function cam rotatable about a second axis spaced from and perpendicular to the film axis has a generally helical peripheral formation which engages with the teeth of the wheel. This helical formation includes an intermittent-drive section having a holding portion constituting almost a complete turn of the formation of zero degree pitch and a switching portion at each end of the holding portion of predetermined pitch greater than zero degrees, and a constant-drive section of constant pitch greater than zero degrees and axially offset from the intermittent-drive section. A shifter is provided for displacing the function cam along its axis relative to the drive wheel so that the teeth on the drive wheel either engage the intermittent-drive section or one of the constant-drive sections axially flanking the intermittent-drive section. A motor is connected to the function cam and rotates it at a relatively slow speed in a forward direction when the teeth of the drive wheel are engaged with the intermittent drive section so as to rotationally step this drive wheel. When engaged with one of the constant-drive sections the motor rotates the function cam at a relatively elevated forward speed for fast-forward motion of the film, and when teeth are engaged with the other constant-drive section the motor rotates the function cam in the opposite direction for fast rewind of the film.

10 Claims, 1 Drawing Figure

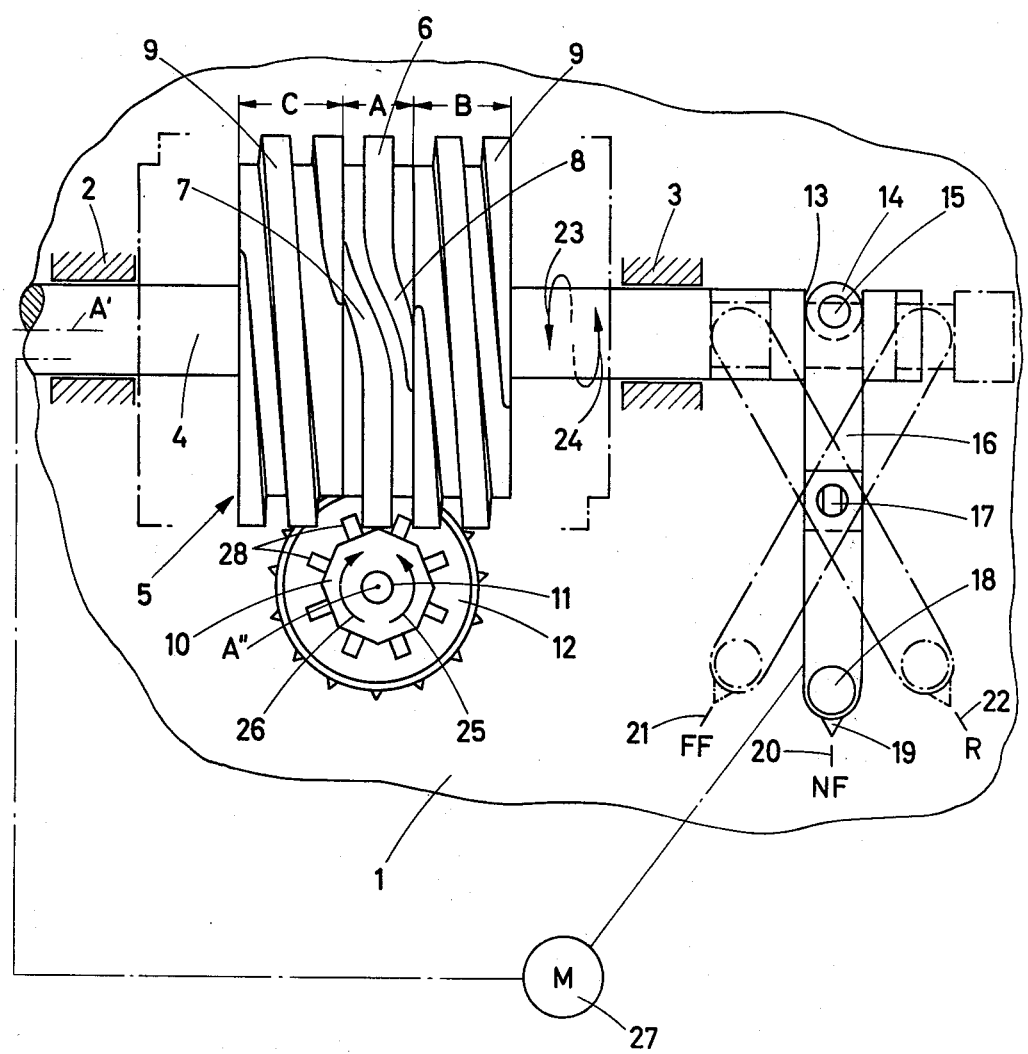

FILM DRIVE FOR MOTION PICTURE APPARATUS

BACKGROUND OF THE INVENTION

This invention relates to a film drive for a motion-picture apparatus. More particularly this invention concerns a film advance for a motion-picture camera or projector.

In both a motion-picture camera and a motion-picture projector it is necessary to drive the film in at least two separate manners: it must be able to move intermittently during exposure or projection in synchronism with appropriate shutter arrangements, and it must be able to move continuously for loading and/or rewinding. Typically the displacement rate during continuous displacement can be no greater than two to three times the normal advance speed during intermittent displacement.

In most movie projectors and cameras the complicatd intermittent-drive arrangement is simply disconnected and an auxiliary continuous drive is connected up for rewinding or loading the film. Such provision of two separate drives considerably increases the cost of the unit as well as its size. Furthermore, after the film has been rewound or advanced continuously it is necessary to orient it again properly behind the shutter, as the sprocket wheel which serves intermittently to drive the film and to synchronize the frames with the shutter action has been disengaged.

SUMMARY OF THE INVENTION

It is therefore an object of the present invention to provide an improved film drive for a motion-picture apparatus.

Another object is the provision of film advance for movie camera or projector which is relatively simple and inexpensive but which has two functions, an intermittent-advance function and a continuous-advance function.

Another object is the provision of such a drive for 35 mm film or the like which does not de-synchronize the frames with the shutter when the film is switched from intermittent to continuous drive or back.

These objects are attained according to the present invention in a film drive having a film drive wheel rotatable about a first axis and having relative to this first axis a plurality of angularly equispaced radial projections. A function cam rotatable about a second axis transverse to the first axis has a generally helical formation thereon engaging the projections of the drive wheel and including an intermittent-drive section constituting almost a complete turn of the helical formation and of substantially 0° pitch and having an end portion of predetermined pitch greater than 0°, and a constant-drive section of constant pitch greater than 0° and offset axially from this intermittent-drive section. Shift means is provided for displacing the axes relative to each other for engagement of the projections of the drive wheel with the intermittent-drive section or with the constant-drive section. A drive motor is provided for continuously rotating the cam about its second axis, so that the drive wheel is advanced intermittently when engaged with the intermittent-drive section and continuously when engaged with the continuous-drive section.

According to further features of this invention the cam is formed as a drum having a generally helically extending ridge. Slightly less than one turn of this ridge constitutes the holding portion of the intermittent-drive section and the rest of the ridge to either side of the holding portion is of generally constant pitch. Two constant drive sections are, therefore, provided, one to each side of the central intermittent-drive section, and the switching portions of the intermittent-drive section are continuations of the constant-drive sections.

The shift means in accordance with further features of this invention can displace the cam between three different positions. In a central position the formations on the drive wheel are only engageable with the intermittent-drive section so that this wheel is only stepped when the switching portions of the intermittent-drive section come into engagement with the formations on the drive wheel. When the shifter moves the cam axially in one direction and increases the speed of the motor, the film is then advanced through the camera/projector in a forward direction at an elevated rate of speed, approximately twice the normal advance rate. When the shifter moves the cam axially in the opposite direction so as to engage the formations on the drive wheel with the other constant-drive section, it also reverses the motor direction so that the film is caused to advance backwardly at an elevated rate of speed which, once again, is approximately twice the normal rate of advance.

According to another feature of the invention the axial distance between axially adjacent regions of the ridge on the cam is smaller than twice the angular space in between the formation on the drive wheel. This insures that the two will always remain in synchronism and that even after a fast-forward or rewind operation the shutter and frame synchronization is maintained.

With the system according to the present invention it is possible very easily to switch the motion-picture apparatus from a normal forward function with intermittent drive of the film to either a fast-forward function in which the film is moved at a constant and high rate of speed in the forward direction or to a rewind function in which the film is moved at a constant and high rate of speed in the reverse direction. The mechanism for carrying this out is relatively simple and can fit in even the smallest hand-held movie camera. In addition, such functions can be added to a camera/projector with only a minor increase in production cost of the camera or projector so that normally deluxe features can be provided even in amateur or home-movie equipment.

The novel features which are considered as characteristic for the invention are set forth in particular in the appended claims. The invention itself however, both as to its construction and its method of operation, together with additional features and advantages thereof will be best understood from the following description of specific embodiment when read in connection with the accompanying drawings.

BRIEF DESCRIPTION OF THE DRAWING

The sole FIGURE of the drawing is a side partly schematic view of the drive system according to this invention.

DESCRIPTION OF THE PREFERRED EMBODIMENT

The drive system 1 shown in the drawing has a pair of fixed bearings 2 and 3, defining an axis A' about which is rotatable a shaft 4 carrying a cam 5. This cam 5 is subdivided into a central region A and a pair of end regions B and C over which extends a generally helical ridge 6–9. In the central region A almost one turn 6 of the ridge constitutes a holding portion of a central intermittent drive section. This holding portion 6 is of 0° pitch and terminates at each end in a switching or end portion 7 and 8 of predetermined pitch. In each of the sections B and C the ridge 9 is of constant pitch, corresponding generally to the pitch of the sections 7 and 8 and forming continuations thereof. Thus the sections B and C can act as simple constant-speed drive worms.

A drive wheel 10 carrying eight angularly equispaced and radially extending projections 28 is carried on a shaft 11 defining an axis A'' spaced from and perpendicular to the axis A' and carrying a sprocket wheel 12 for engaging the film in the motion-picture apparatus embodying the drive system 1.

The one end of the shaft 4 is connected to a reversible two-speed electric drive motor 27 and the other end is formed with a circumferential groove 13 in which engages a roller 14 rotatable about an axis 15 on the end of a lever 16 pivoted on the motion-picture apparatus at 17. The other end of the lever 16 has an operating knob 18 and a pointer 19 engageable in a central position 20 with indicia indicating operation of the camera/projector at normal forward speed, with indicia 21 indicating operation of the camera/projector at fast forward speed, and with indicia 22 indicating operation of the camera/projector at a fast reverse speed for rewind.

During normal-forward operation of the camera/projector, the lever 16 is in the solid-line position and the motor 27 connected to this lever 16 operates at a relatively slow speed to rotate the shaft 4 about the axis A' in a direction indicated by arrow 23. Since the center section A of the cam 5 only engages the wheel 10 this wheel 10 will not rotate at all about its axis A' so long as the 0° pitch section 6 is between the projections 28, but will step one increment in the direction of arrow 25 when the sections 7 and 8 engage the projections 28. Thus for each revolution of the shaft 4 about the axis A' in the direction of arrow 23 the shaft 11 of the wheel 10 will be moved one increment in the direction of arrow 25. When not engaging the switching portions 7 and 8 of the section A the wheel 10 does not rotate at all.

In order to switch from intermittent-forward drive to fast-forward drive the lever 18 is moved to the left until the pointer 19 is in line with the indicia 21. This causes the cam 5 to act as a rack for the wheel 10 so as to turn it in the direction of arrow 26 until section C of the cam 5 is aligned with the wheel 10. In this position the drive system, with the shaft 4 now rotating at a relatively high speed about the axis A' in the direction of arrow 23 to rotate the wheel in the direction of arrow 25. During such fast-forward drive the rotation in the direction of arrow 25 will be considerably faster than the average advance speed during normal running of the device as the motor speed is increased.

Swinging of the lever 16 to the right so that the pointer 19 is aligned with the indicia 22 for rewind or fast reverse of the apparatus causes opposite rotation of the shaft. During the switch-over operation the cam 5 again acts as a rack to rotate the wheel 10 in the direction of arrow 25. Once the section C is aligned with the wheel 10, however, the reversed rotation of the shaft 4 in the direction of arrow 24 at a relatively high speed causes the wheel to rotate at a constant speed in the direction of arrow 26. Thus, it is seen that in the central position the motor 27 rotates the shaft 4 in the direction of arrow 23 at a relatively slow speed, whereas in the fast-forward position, the motor 27 rotates this shaft 4 in the direction of arrow 23 at a higher rate of speed, and in the rewind position it rotates it in the direction of arrow 24 at a similarly high speed.

The lever 16 can be provided with a detent to hold it in the two end positions, or can simply be provided with torque springs to return it to the central position so that it has to be held in these end positions during fast-forward operation or rewind.

The shutter of the camera or projector is operated by the rotation of the shaft 4. Since with this system the same sprocket wheel 12 is used for fast-forward advance and rewind advance proper synchronization of the shutter and the frames of the film is insured even after a fast-forward or rewind operation.

It will be understood that each of the elements described above, or two or more together, may also find a useful application in other types of apparatus differing from the types described above.

While the invention has been illustrated and described as embodied in a film drive for motion-picture apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A film drive for a motion-picture apparatus, said drive comprising: a film drive wheel rotatable about a first axis and having relative thereto a plurality of angularly equispaced radially extending projections; a function cam rotatable about a second axis transverse to said first axis and having a generally helical peripheral formation engaging said wheel at said projections and including an intermittent-drive section having a holding portion constituting almost a complete turn of said formation of substantially 0° pitch and a switching portion of predetermined pitch greater than 0°, and a constant-drive section of constant pitch greater than 0° and axially offset from said intermittent-drive section; shift means for displacing said axes relative to each other for engagement of said projections with said intermittent-drive section or with said constant-drive section; and drive means for continuously rotating said cam about said drive axis, whereby said drive wheel is advanced intermittently when engaging said intermittent-drive section and continuously when engaging said constant-drive section.

2. The drive defined in claim 1 wherein said shift means includes a support for said cam permitting same to move along said drive axis.

3. The drive defined in claim 2 wherein said formation is a ridge on said cam.

4. The drive defined in claim 3 wherein said cam is formed with a second such constant-drive section to the opposite axial side of said intermittent-drive section as the first-mentioned constant-drive section, said projections being engageable in said second constant-drive section.

5. The drive defined in claim 4, further comprising means connected to said drive means for reversing the rotation direction of said cam on engagement of said projections in said second constant-drive section.

6. The drive defined in claim 5, further comprising means connected to said drive means for rotating said cam at a substantially greater angular speed when said drive wheel is in engagement with either of said constant-drive sections.

7. The drive defined in claim 3 wherein said ridge is of generally constant pitch at said intermittent-drive section and said switching portion.

8. The drive defined in claim 3 wherein the axial distance between axially adjacent regions of said ridge is smaller than twice the angular spacing between said formations.

9. The drive defined in claim 3 wherein said formations are radially projecting teeth engageable in the spaces between adjacent turns of said ridge.

10. The drive defined in claim 3 wherein said cam is a generally cylindrical drum formed with said ridge.

* * * * *